United States Patent
Tsirkin et al.

(10) Patent No.: US 9,841,927 B2
(45) Date of Patent: Dec. 12, 2017

(54) REMOTE DIRECT MEMORY ACCESS WITH COPY-ON-WRITE SUPPORT

(71) Applicant: Red Hat Israel, Ltd., Raanana (IL)

(72) Inventors: Michael Tsirkin, Yokneam Yillit (IL); Gleb Natapov, Herzliya (IL)

(73) Assignee: Red Hat Israel, Ltd, Raanana (IL)

( * ) Notice: Subject to any disclaimer, the term of this patent is extended or adjusted under 35 U.S.C. 154(b) by 0 days.

(21) Appl. No.: 14/033,849

(22) Filed: Sep. 23, 2013

(65) Prior Publication Data

US 2015/0089009 A1   Mar. 26, 2015

(51) Int. Cl.
   *G06F 3/06*       (2006.01)
   *G06F 12/08*      (2016.01)
   *G06F 13/28*      (2006.01)

(52) U.S. Cl.
   CPC ............ *G06F 3/067* (2013.01); *G06F 12/08* (2013.01); *G06F 13/28* (2013.01)

(58) Field of Classification Search
   CPC .......... G06F 3/067; G06F 12/08; G06F 13/28
   USPC ..................................... 710/62; 718/1; 711/6
   See application file for complete search history.

(56) References Cited

U.S. PATENT DOCUMENTS

| | | | | |
|---|---|---|---|---|
| 5,555,385 | A * | 9/1996 | Osisek ................ | G06F 12/1475 711/1 |
| 7,281,030 | B1 | 10/2007 | Davis | |
| 7,430,615 | B2 | 9/2008 | Blackmore et al. | |
| 7,529,867 | B2 | 5/2009 | McCrory et al. | |
| 7,840,765 | B2 | 11/2010 | VelurEunni | |
| 8,214,828 | B2 * | 7/2012 | Watkins ................ | G06F 9/4555 718/1 |
| 8,327,059 | B2 | 12/2012 | Chen et al. | |
| 8,578,369 | B2 * | 11/2013 | Dai ..................... | G06F 9/45558 717/166 |
| 2005/0097294 | A1 * | 5/2005 | Hepkin ................ | G06F 9/4812 711/170 |
| 2006/0206658 | A1 * | 9/2006 | Hendel ................ | G06F 9/544 711/6 |
| 2008/0104337 | A1 * | 5/2008 | VelurEunni ......... | G06F 12/1081 711/150 |

(Continued)

FOREIGN PATENT DOCUMENTS

WO         2009143381         11/2011

OTHER PUBLICATIONS

Bellosa, Frank, Dr., "Enabling Fast VM Deployment and Migration in Tightly Interconnected HPC Cloud Environments," Manual Gutekunst, 38 pages, Oct. 20, 2011-Jan. 31, 2012.

(Continued)

*Primary Examiner* — Eric Oberly
(74) *Attorney, Agent, or Firm* — Lowenstein Sandler LLP (57) ABSTRACT

Systems and methods for implementing remote direct memory access (RDMA) with copy-on-write support. An example method may comprise: registering, with an RDMA adapter, by a first computer system, a mapping of a first virtual address to a first physical address, for transmitting a memory page identified by the first virtual address to a second computer system; registering, with the RDMA adapter, a mapping of a second virtual address to the first physical address; detecting an attempt to modify the memory page; copying the memory page to a second physical address; and registering, with the RDMA adapter, a mapping of a first virtual address to the second physical address.

20 Claims, 5 Drawing Sheets

(56) References Cited

U.S. PATENT DOCUMENTS

| | | | | |
|---|---|---|---|---|
| 2010/0083276 | A1* | 4/2010 | Green et al. | 719/313 |
| 2010/0299667 | A1* | 11/2010 | Ahmad | G06F 12/1018 |
| | | | | 718/1 |
| 2011/0010515 | A1* | 1/2011 | Ranade | 711/162 |
| 2012/0066677 | A1* | 3/2012 | Tang | 718/1 |
| 2013/0031331 | A1* | 1/2013 | Cheriton et al. | 711/206 |
| 2013/0047159 | A1* | 2/2013 | Low | G06F 9/45558 |
| | | | | 718/1 |
| 2013/0067468 | A1* | 3/2013 | Tillier | G06F 9/545 |
| | | | | 718/1 |
| 2013/0246685 | A1* | 9/2013 | Bhargava et al. | 711/6 |
| 2013/0332920 | A1* | 12/2013 | Laor | 718/1 |
| 2014/0297775 | A1* | 10/2014 | Davda | G06F 13/28 |
| | | | | 709/212 |
| 2014/0365816 | A1* | 12/2014 | Antony | G06F 11/2094 |
| | | | | 714/6.11 |
| 2015/0012735 | A1* | 1/2015 | Tamir et al. | 713/2 |

OTHER PUBLICATIONS

Gerofi, B., "RDMA Based Replication of Multiprocessor Virtual Machines over High-Performance Interconnects".

Tsirkin, Michael, "[Qemu-devel] [PATCHv2] rdma: add a new IB_ACCESS_Gift flag—msg#00077", http://ieeexplore.ieee.org/xpl/login.jsp?tp=&arnumber=6061063&url=http%3A%2F%2Fieeexplore.ieee.org%2Fxpls%2Fabs_all.jsp%3Farnumber%3D6061063, Mar. 24, 2013.

\* cited by examiner

REMOTE DIRECT MEMORY ACCESS WITH COPY-ON-WRITE SUPPORT

TECHNICAL FIELD

The present disclosure is generally related to virtualized computer systems, and is more specifically related to systems and methods for remote direct memory access (RDMA).

BACKGROUND

Remote Direct Memory Access (RDMA) is a method allowing a computer system to directly read or modify the memory of another computer system. RDMA-enabled network interface adapter establishes connections to transfer the data directly between specified buffers in the user-space memory. Such data transfers require no work to be done by processors and no context switches, and the transfers may continue in parallel with other system operations. When an application performs an RDMA read or write request, the application data is delivered directly to the network, reducing latency and enabling fast data transfer.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Described herein are methods and systems for implementing RDMA with copy-on-write support. "Copy-on-write" herein shall refer to a memory allocation technique involving mapping the same physical memory page into address spaces of two or more processes (or virtual machines) which may be unaware of the shared use of the memory page. When one of the processes (or virtual machines) attempts to modify the shared memory page, a copy of the page is created and mapped into the address space of the process (or the virtual machine), so that the process (or the virtual machine) would modify the newly created copy. The mapping is transparent to both the process (or the virtual machine) attempting the memory page modification and the other processes (or virtual machines) using the shared memory page.

In conventional systems, if a memory page is shared by a copy-on-write method, and one of the sharing applications uses RDMA, a private copy of the memory page would be created at the time of registering the page with a RDMA-enabled network interface adapter, even if the RDMA is employed for read access only. The reason for triggering a copy-break at the RDMA registration time is that RDMA write access may be transparent to the local memory manager, and hence the memory manager may be unaware of a shared memory page having being modified by a process running on a remote computer system.

Triggering a copy-break at the RDMA registration time, while preventing corruption of the contents of memory in the distributed system, also prevents the memory from being overcommitted. However, memory overcommitting may be highly desirable, especially for host computer systems running multiple virtual machines.

Aspects of the present disclosure address the above noted deficiencies by preventing the kernel from triggering a copy-break at the RDMA registration time, assuming that the memory page being registered would not be modified. Should an application later modify the memory page that was registered without triggering a copy break, the memory page can be copied to a new physical address, re-registered with the new physical address, and re-sent via the RDMA adapter to the remote computer system.

The methods described herein below may be implemented by both non-virtualized computer systems and by hypervisors running on host computer systems to enable execution of virtual machines. Various aspects of the above referenced methods and systems are described in details herein below by way of examples, rather than by way of limitation.

Figure 1:
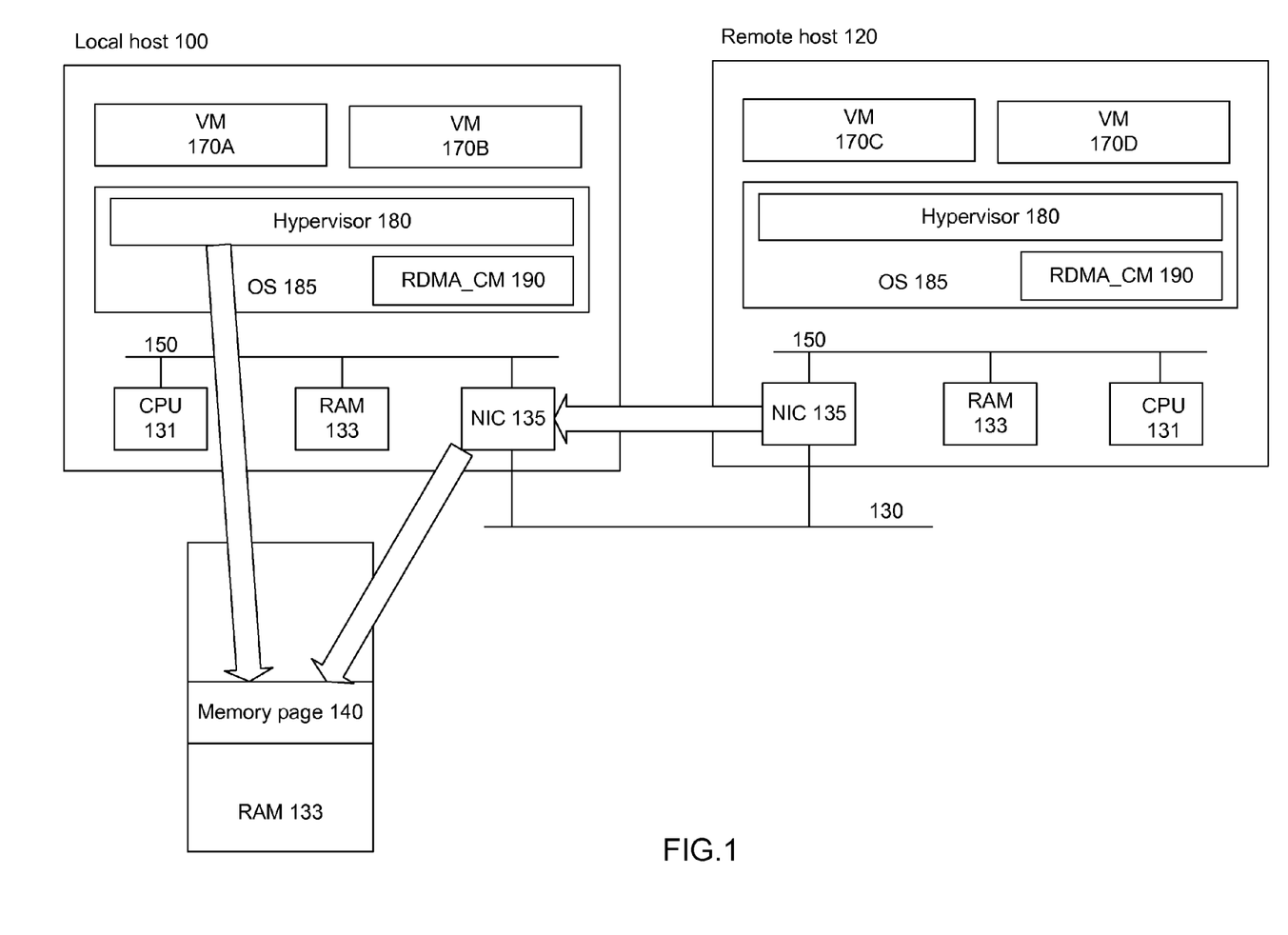
FIG. 1 depicts a high-level component diagram of one illustrative embodiment of a computer system 1000 in accordance with one or more aspects of the present disclosure.

FIG. 1 depicts a high-level component diagram of one illustrative example of a computer system 100 in accordance with one or more aspects of the present disclosure. "Computer system" herein shall refer to a system comprising one or more processors, one or more memory devices, and one or more input/output (I/O) interfaces.

Computer system 100 may be interconnected, via a network 130, with one or more remote computers. Computer system 100 may comprise one or more processors 131 communicatively coupled to a memory device 133 and a network interface controller (NIC) 135. Local connections within host computer system 110, including connections between processor 131, memory device 133, and NIC 135, may be provided by one or more local buses 150 of a suitable architecture.

"Physical processor" or "processor" herein shall refer to a device capable of executing instructions encoding arithmetic, logical, or I/O operations. In one illustrative example, a processor may follow Von Neumann architectural model and may comprise an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU). "Memory device" herein shall refer to a volatile or non-volatile memory device, such as RAM, ROM, EEPROM, or any other device capable of storing data. "Network interface adapter" herein shall refer to a device capable of implementing a physical layer and data link layer standard (such as Ethernet or InfiniBand).

In an illustrative example, as schematically illustrated by FIG. 1, computer system 100 may run multiple virtual machines 170 by executing a software layer 180, often referred to as "hypervisor," above the hardware and below the virtual machines. In certain implementations, hypervisor 180 may be a component of operating system 185 executed by host computer system 100. Alternatively, hypervisor 180 may be provided by an application running under host operating system 185, or may run directly on the host computer system 100 without an operating system beneath it. Hypervisor 180 may abstract the physical layer, including processors, memory, and I/O devices, and present this abstraction to virtual machines 170 as virtual devices, including virtual processors, virtual memory, and virtual I/O devices.

In another illustrative example (not shown in FIG. 1), computer system 100, instead of executing virtual machines 170, may run one or more non-virtualized applications under operating system 185.

Computer system 100 may implement a virtual memory system where pages of an address space of a process or a virtual machine are mapped to the physical memory. The address space virtualization may be handled through the processor's paging mechanism. Paging may support a virtual memory environment where a large linear address space is simulated with a smaller amount of random access memory (RAM) and some disk storage. Each memory segment may be divided into pages of a defined size (e.g., 4 KB) which may be stored either in RAM or on the disk. The operating system may maintain a page directory and a set of page tables to keep track of the pages. When a process attempts to access an address location in the linear address space, the processor may use the page directory and page tables to translate the linear address into a physical address. If the page being accessed is not currently in physical memory, the processor may generate a page fault exception, and the operating system may then read the page from the disk and continue executing the thread. The processor may also generate a page fault exception if the memory page being accessed is write-protected (e.g., by setting a flag in the page table).

In certain implementations, computer system 100 may support copy-on-write memory mapping method involving mapping of the same physical memory page into address spaces of two or more processes (or virtual machines) which may be unaware of the shared use of the memory page. A memory page in a copy-on-write state may be write-protected, so that an attempt to modify the page would cause a page fault. When one of the processes (or virtual machines) sharing a copy-on-write memory page attempts to modify the shared memory page, a page fault exception is triggered, and a copy of the page is created and mapped into the address space of the process (or the virtual machine), so that the process (or the virtual machine) would modify the newly created copy. The mapping is transparent to both the process (or the virtual machine) attempting the memory page modification and the other processes (or virtual machines) using the shared memory page.

In certain implementations, computer system 100 may support RDMA. RDMA-enabled network interface controller (RNIC) 135 may be provided, e.g., by a RDMA-enabled Ethernet adapter or InfiniBand host channel adapter. RNIC 135 may be programmed to directly read or write the user space memory. Before performing an RDMA operation with respect to a user space memory region, RDMA communications manager 190 may register the memory region with RNIC 135.

Memory registration is a mechanism that allows an application to describe a plurality of virtually contiguous memory locations or a plurality of physically contiguous memory locations to the network adapter as a virtually contiguous memory region using virtual addresses. In the process of registration, RDMA communications manager 190 may "pin" the memory region, i.e., make it non-swappable to a secondary storage. Then, the RNIC may store a mapping of the virtual address of the memory region to a corresponding physical address in the physical memory.

Prior to performing RDMA read or write operations, appropriate permissions to access the memory may be specified by the remote host. A local process initiating an RDMA read operation may specify a remote memory address and a local memory address. The RNIC may copy one or more memory pages from the remote address to the local address specified. A local process initiating an RDMA write operation may specify a local address and a remote address. The RNIC may copy one or more memory pages from the local address to the remote address specified. RDMA read/write operations may be conducted with no notification to the remote host.

As noted herein above, in conventional systems, if a memory page is shared by a copy-on-write method, and one of the sharing applications uses RDMA, a private copy of the memory page would be created at the time of registering the page with a RDMA-enabled network interface adapter, even if the RDMA is employed for read access only. Triggering a copy-break at the RDMA registration time, while preventing corruption of the contents of memory in the distributed system, also prevents the memory from being overcommitted. However, memory overcommitting may be highly desirable, especially for host computer systems running multiple virtual machines.

In accordance with one or more aspects of the present disclosure, a copy-break at the RDMA registration time is not performed, as the RDMA application may be assumed to register the memory page for read-only access. The registered memory page may be write-protected. Should an application later modify the copy-on-write memory page that was registered without triggering a copy break, RDMA communications manager 190 may, responsive to a page fault exception triggered by a write attempt, initiate the copy-break so that the memory page will be copied to a new physical address. RDMA communications manager 190 may then re-register the memory page with the new physical address, and request the RDMA adapter to retransmit the memory page to the remote computer system.

In an illustrative example, one or more copy-on-write memory pages 140 residing within memory 133 of local host 100 may be shared by a first virtual machine 170A executed by local host 100 and a second virtual machine 170C executed by remote host 120. The latter may access one or more memory pages 140 via RDMA.

In another illustrative example, virtual machine 170A may be undergoing live migration from local host computer system 100 to remote host computer system 120. Live migration may involve copying the virtual machine execution state from the origin host to the destination host. The virtual machine execution state may comprise the memory state, the virtual processor state, the virtual devices state, and/or the connectivity state. Hypervisor 180 may copy, over network 130, the execution state of migrating virtual machine 170A, including a plurality of memory pages, from local host 100 to remote host 120 while virtual machine 170A is still running on local host 110. One or more copy-on-write memory pages 140 residing within memory 133 of local host 100 may be shared by virtual machine 170A executed by local host 100 and virtual machine 170C which is a remote copy of virtual machine 170A. Remote host 120 may access one or more memory pages 140 via RDMA.

Figure 2:
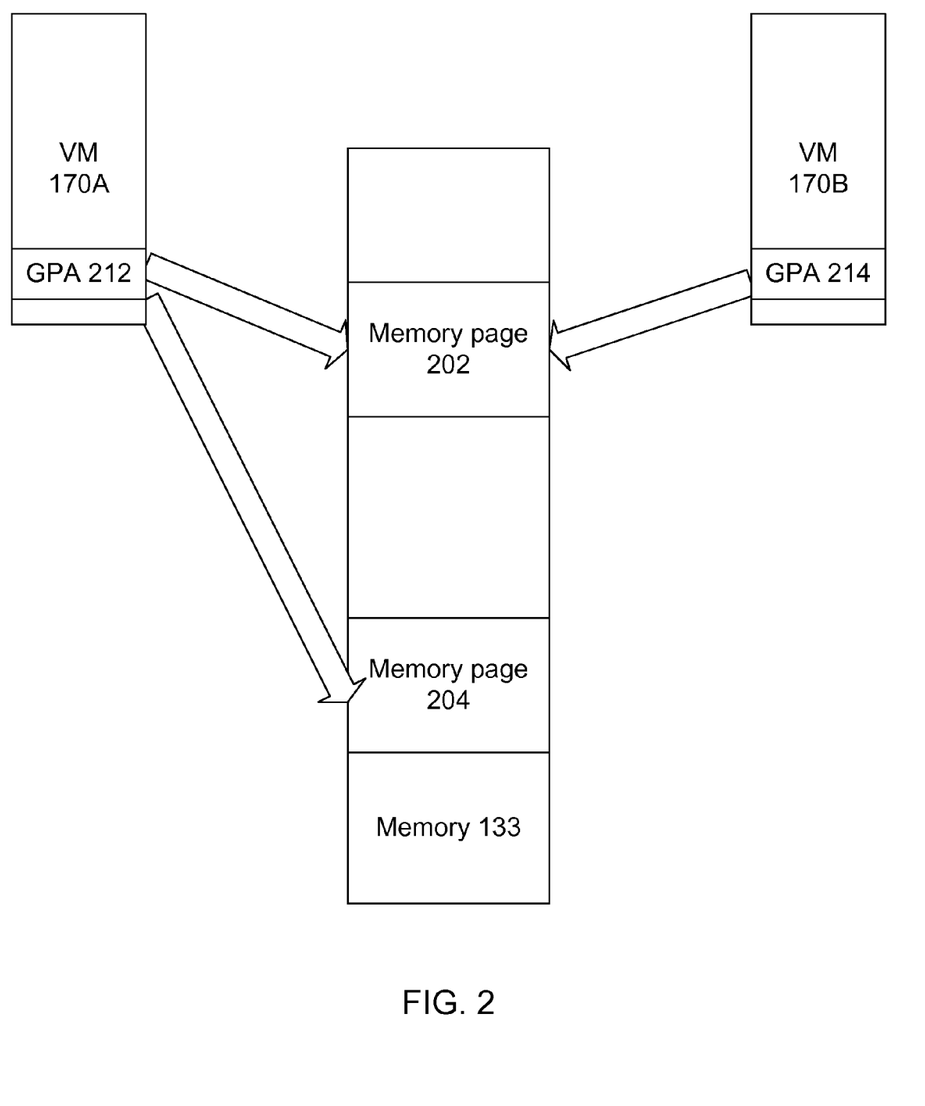
FIGS. 2-3 schematically illustrate various scenarios of mappings of virtual addresses to physical memory pages, in accordance with one or more aspects of the present disclosure.

As schematically illustrated by FIG. 2, a memory page 202 residing within the physical memory 133 of host computer system 100 of FIG. 1 may be shared by two virtual machines 170A and 170B, and hence may be mapped in the address spaces of both virtual machines using guest physical addresses 212 and 214, respectively. Hypervisor 180 may register the mappings of guest addresses 212 and 214 to the physical address of memory page 202 with the RDMA adapter of host computer system 100.

As noted herein above, a copy-break at the RDMA registration time is not performed, as the RDMA application may be assumed to access memory page 202 in the read-only mode. Responsive to completing RDMA registration of memory page 202, the memory page may be write protected, so that a write attempt to the memory page would cause a page fault exception. Should virtual machine 170A later modify memory page 202, the RDMA communications manager may, responsive to the page fault exception, initiate the copy-break so that memory page 202 will be copied to a new physical address 204. RDMA communications manager 190 may then re-register the mapping of the newly created memory page 204 to the address space of virtual machine 170A using guest physical address 212 that was previously mapped to the copy-on-write shared memory page 202. Upon registering the newly created memory page 204, RDMA communications manager 190 may request the RDMA adapter to transmit the memory page to the remote computer system.

Figure 3:
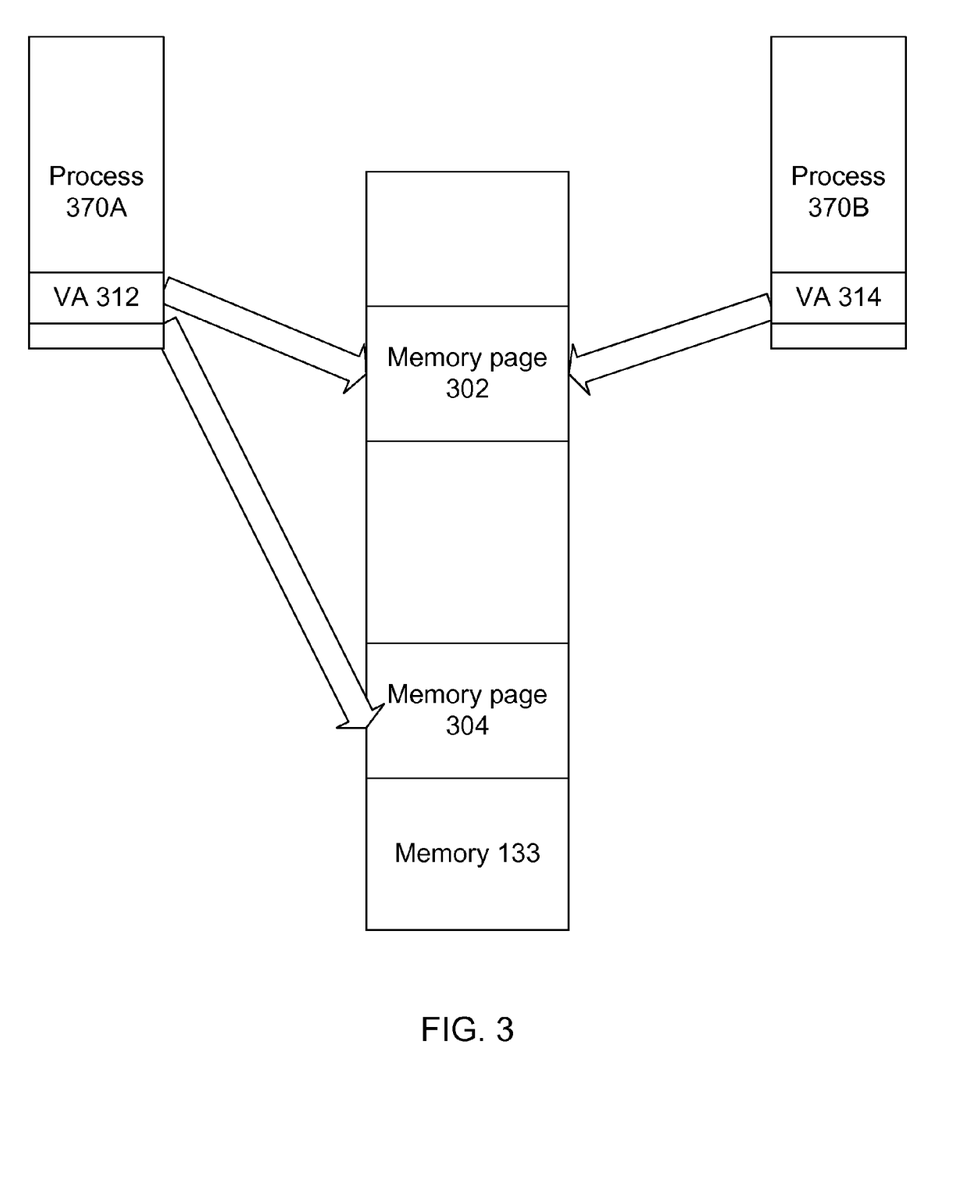

In a further illustrative example, a copy-on-write memory page 120 may be shared by two or more non-virtualized applications executed by computer system 100. As schematically illustrated by FIG. 3, a memory page 302 residing within the physical memory of a host computer system may be shared by two processes 370A and 370B, and hence may be mapped in the virtual address spaces of both processes using virtual addresses 312 and 314, respectively. The host memory manager may register the mappings of virtual addresses 312 and 314 to the physical address of memory page 302 with the RDMA adapter.

As noted herein above, a copy-break at the RDMA registration time is not performed, as the RDMA application may be assumed to access memory page 302 in the read-only mode. Should process 370A later modify memory page 302, the RDMA communications manager may initiate the copy-break so that memory page 302 will be copied to a new physical address 304. RDMA communications manager 190 may then re-register the mapping of the newly created memory page 304 to the virtual address space of process 370A using guest physical address 312 that was previously mapped to the copy-on-write shared memory page 302. Upon registering the newly created memory page 304, RDMA communications manager 190 may request the RDMA adapter to transmit the memory page to the remote computer system.

Figure 4:
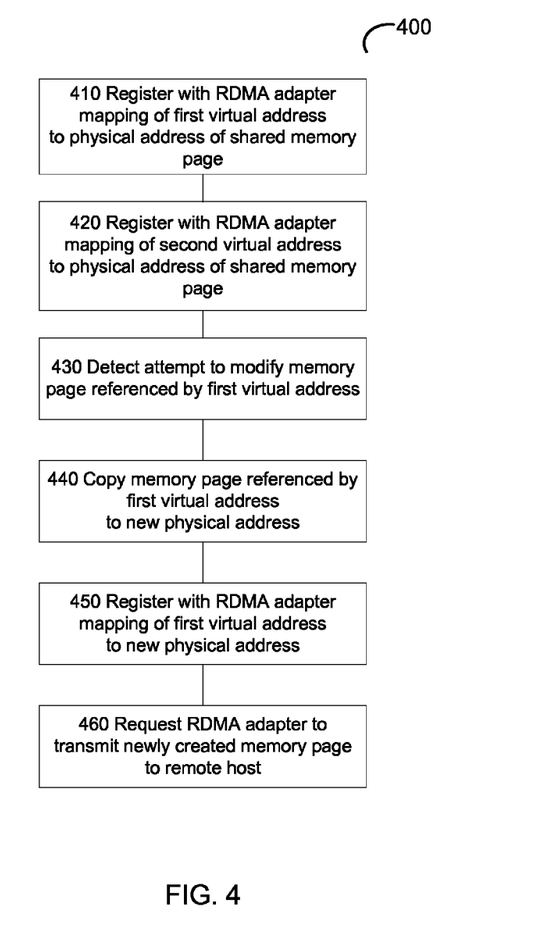
FIG. 4 depicts a flow diagram of a method for implementing RDMA with copy-on-write support, in accordance with one or more aspects of the present disclosure.

FIG. 4 depicts a flow diagram of one embodiment of a method 400 for implementing RDMA with copy-on-write support. The method 400 may be performed by a computer system that may comprise hardware (e.g., circuitry, dedicated logic, and/or programmable logic), software (e.g., instructions executable on a computer system to perform hardware simulation), or a combination thereof. The method 400 and/or each of its individual functions, routines, subroutines, or operations may be performed by one or more physical processors of the computer system executing the method.

At block 410, a computer system may register, with an RDMA adapter, a mapping of a physical address of a shared memory page to a first virtual address. As noted herein above, in one illustrative example, the memory page may be copy-on-write shared by two or more virtual machines, and hence the first virtual address may reference the memory space of a first virtual machine of the two or more virtual machines. In another illustrative example, the memory page may be copy-on-write shared by two or more processes running on a non-virtualized computer system, and hence the first virtual address may reference the memory space of a first process of the two or more processes.

At block 420, the computer system may register, with the RDMA adapter, a mapping of a second virtual address to the physical address of the shared memory page. In one illustrative example, the second virtual address may reference the memory space of a second virtual machine of the two or more virtual machines sharing the physical memory page. In another illustrative example, the second virtual address may reference the memory space of a second process of the two or more processes sharing the physical memory page. Responsive to registering the second virtual address with the RDMA adapter, the computer system may write-protect the memory page.

At block 430, the computer system may detect an attempt to modify the memory page referenced by the first virtual address (e.g., by receiving a page fault exception triggered by a write attempt to a write-protected memory page).

At block 440, the computer system may copy the shared memory page to a new physical address.

At block 450, the computer system may register, with the RDMA adapter of the host computer system, the mapping of the mapping of the newly created memory page to the virtual address space of the process (or virtual machine) that attempted to modify the shared memory page, using the first virtual address that was previously mapped to the physical address original copy-on-write shared memory page.

At block 460, the computer system may request the RDMA adapter to transmit the newly created memory page to the remote computer system. Upon completing the operations schematically described by block 460, the method may terminate.

Figure 5:
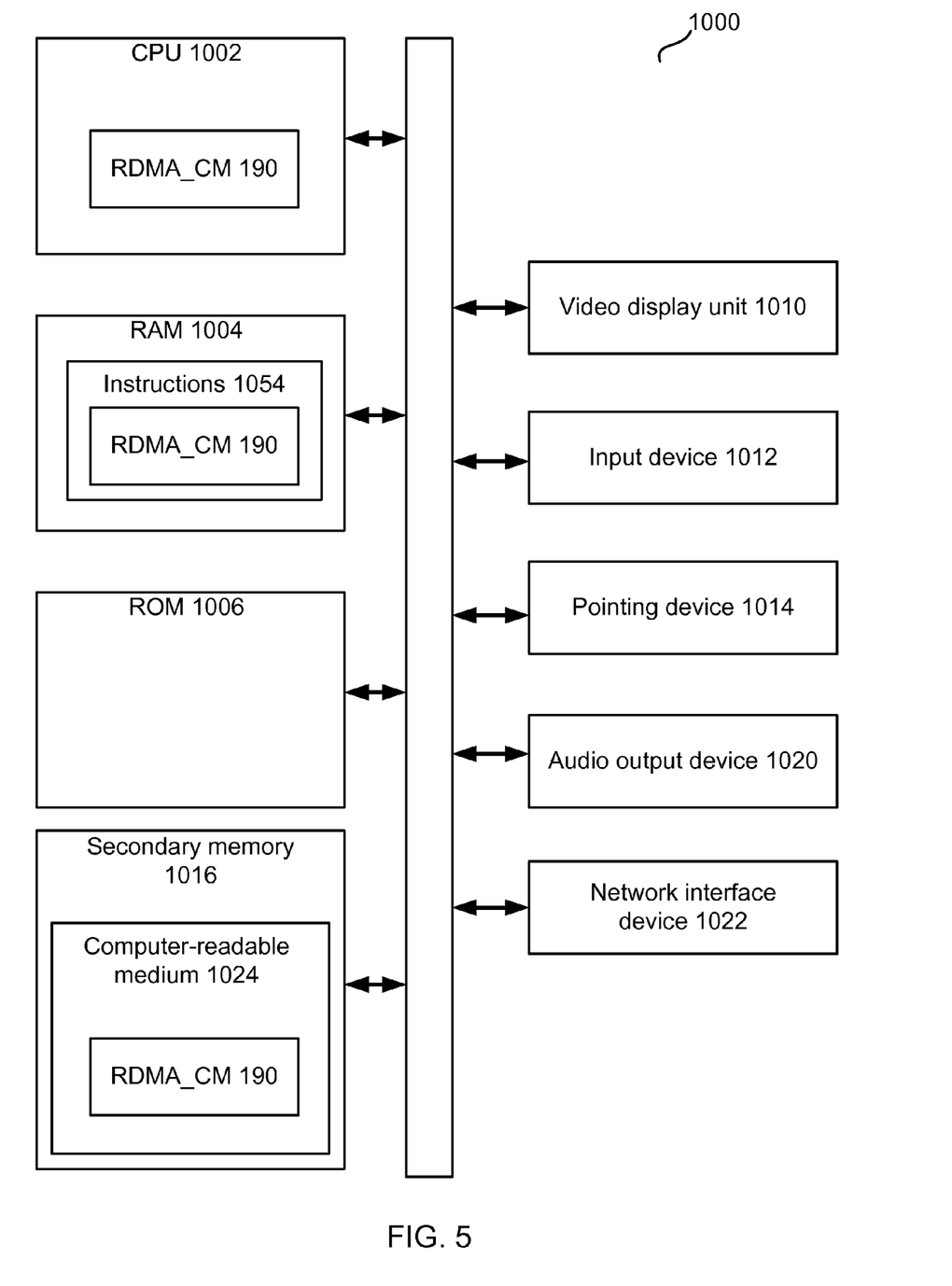
FIG. 5 depicts a block diagram of an illustrative computer system operating in accordance with the examples of the present disclosure.

FIG. 5 depicts an example computer system 1000 within which a set of instructions, for causing the computer system to perform any one or more of the methods described herein, may be executed. In certain implementations, computer system 1000 may correspond to computer system 100 of FIG. 1.

In one example, computer system 1000 may be connected (e.g., via a network, such as a Local Area Network (LAN), an intranet, an extranet, or the Internet) to other computer systems. Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 1000 may comprise a physical processor 1002, a volatile memory 1004 (e.g., random access memory (RAM)), a non-volatile memory 1006 (e.g., read-only memory (ROM) or electrically-erasable programmable ROM (EEPROM)), and a secondary memory 1016 (e.g., a data storage device), which may communicate with each other via a bus 1008.

The processor 1002 may be provided by one or more physical processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

The computer system 1000 may further comprise a network interface device 1022. The computer system 1000 also may comprise a video display unit 1010 (e.g., an LCD), an alphanumeric input device 1012 (e.g., a keyboard), a pointing device 1014 (e.g., a mouse), and an audio output device 1020 (e.g., a speaker).

The secondary memory 1016 may comprise a non-transitory computer-readable storage medium 1024 on which may be stored instructions of RDMA communications manager 190 implementing the method 400 of RDMA with copy-on-write support. Instructions of RDMA communications manager 190 may also reside, completely or partially, within the main memory 1004 and/or within the processor 1002 during execution thereof by the computer system 1000, hence, the main memory 1004 and the processor 1002 may also constitute machine-readable storage media.

While the computer-readable storage medium 1024 is shown in the illustrative embodiment as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any non-transitory medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system's registers and memories into other data similarly represented as physical quantities within the computer system memories or registers or other such information storage, transmission or display devices.

Embodiments described herein also relate to an apparatus for performing the methods described herein. This apparatus may be specially constructed for the required purposes, or it may comprise a general purpose computer system selectively programmed by a computer program stored in the computer system. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples and embodiments, it will be recognized that the present disclosure is not limited to the embodiments described. The scope of the disclosure should be determined with reference to the following claims, along with the full scope of equivalents to which the claims are entitled.

The invention claimed is:

1. A method, comprising:
registering, with a remote direct memory access (RDMA) adapter, by a processor of a first computer system without invoking a copy-break with respect to a memory page, a first mapping of a first virtual address residing within an address space of a first virtual machine running on the first computer system, for read-only access to a memory page identified by the first virtual address;
registering, with the RDMA adapter, by the processor without invoking the copy-break with respect to the memory page, a second mapping of a second virtual address residing within an address space of a second virtual machine running on a second computer system, wherein the second computer system is communicably coupled, via the RDMA adapter, to the first computer system, and wherein the first mapping and the second mapping share a physical address within an address space of the first computer system; and
responsive to detecting an attempt, by the first virtual machine, to modify the memory page,
copying the memory page to a second physical address;
registering, with the RDMA adapter, a third mapping of the first virtual address to the second physical address; and
transmitting the memory page to the second computer system.

2. The method of claim 1, further comprising:
causing the RDMA adapter to send to the second computer system the memory page identified by the second physical address.

3. The method of claim 1, wherein registering the first mapping comprises write-protecting the memory page.

4. The method of claim 1, wherein registering the first mapping is performed by a hypervisor running on the first computer system.

5. The method of claim 1, wherein at least one of the first virtual machine or the second virtual machine is undergoing live migration to a second computer system.

6. A system comprising:
a memory;
a remote direct memory access (RDMA) adapter operatively coupled to the memory; and
a processor, operatively coupled to the memory, the processor to:
register, with the RDMA adapter, a first mapping of a first virtual address residing within an address space of a first virtual machine running on the first computer system without invoking a copy-break with respect to a memory page, for read-only access to a memory page identified by the first virtual address;
register, with the RDMA adapter without invoking the copy-break with respect to the memory page, a second mapping of a second virtual address residing within an address space of a second virtual machine running on a second computer system, wherein the second computer system is communicably coupled, via the RDMA adapter, to the first computer system, and, wherein the first mapping and the second mapping share a physical address within an address space of the first computer system; and
responsive to detecting an attempt, by the first virtual machine, to modify the memory page,
copy the memory page to a second physical address;
register, with the RDMA adapter, a third mapping of the first virtual address to the second physical address; and
transmit the memory page to the second computer system.

7. The system of claim 6, wherein the processor is further to:
cause the RDMA adapter to send to the second computer system the memory page identified by the second physical address.

8. The system of claim 6, wherein, to register the first mapping, the processor is to invoke a hypervisor.

9. A computer-readable non-transitory storage medium comprising executable instructions to cause a processor to:
register, by the processor, with a remote direct memory access (RDMA) adapter, a first mapping of a first virtual address residing within an address space of a first virtual machine running on the first computer system without invoking a copy-break with respect to a memory page, for read-only access to a memory page identified by the first virtual address;
register, by the processor, with the RDMA adapter without invoking the copy-break with respect to the memory page, a second mapping of a second virtual address residing within an address space of a second virtual machine running on a second computer system, wherein the second computer system is communicably coupled, via the RDMA adapter, to the first computer system, and, wherein the first mapping and the second mapping share a physical address within an address space of the first computer system; and
responsive to detecting an attempt, by the first virtual machine, to modify the memory page,
copy the memory page to a second physical address;
register, with the RDMA adapter, a third mapping of the first virtual address to the second physical address; and
transmit the memory page to the second computer system.

10. The computer-readable non-transitory storage medium of claim 9, further comprising executable instructions to cause the processor to:
cause the RDMA adapter to send to the second computer system the memory page identified by the second physical address.

11. The system of claim 6, wherein at least one of the first virtual machine or the second virtual machine is undergoing live migration to a second computer system.

12. The system of claim 6, wherein to register the first mapping, the processor is to write-protect the memory page.

13. The system of claim 6, wherein the first mapping, the processor is to pin a memory block identified by the first physical address.

14. The computer-readable non-transitory storage medium of claim 9, wherein executable instructions to cause the processor to register the first mapping do not cause the processor to create a copy of the memory page identified by the first physical address.

15. The computer-readable non-transitory storage medium of claim 9, wherein at least one of the first virtual machine or the second virtual machine is undergoing live migration to a second computer system.

16. The computer-readable non-transitory storage medium of claim 9, wherein executable instructions to cause the processor to register the first mapping comprise executable instructions to cause the processor to write-protect the memory page.

17. The computer-readable non-transitory storage medium of claim 9, wherein executable instructions to cause the processor to register the first mapping comprise executable instructions to cause the processor to pin a memory block identified by the first physical address.

18. The method of claim 1, wherein registering the first mapping comprises making non-swappable a memory block identified by the first physical address.

19. The method of claim 1, wherein detecting the attempt to modify the memory page comprises detecting a page fault with respect to the memory page.

20. The method of claim 1, wherein registering the first mapping comprises setting, in a page table, a flag associated with the memory page.

* * * * *